(12) United States Patent
Griffin

(10) Patent No.: US 10,183,387 B2
(45) Date of Patent: Jan. 22, 2019

(54) KEY PRESS FOR SECURING A SHACKLE ASSEMBLY

(71) Applicant: Michael Griffin, San Diego, CA (US)

(72) Inventor: Michael Griffin, San Diego, CA (US)

(*) Notice: Subject to any disclaimer, the term of this patent is extended or adjusted under 35 U.S.C. 154(b) by 114 days.

(21) Appl. No.: 15/240,893

(22) Filed: Aug. 18, 2016

(65) Prior Publication Data

US 2018/0050443 A1  Feb. 22, 2018

(51) Int. Cl.
  *B25B 27/14*  (2006.01)
  *F16G 15/02*  (2006.01)
  *B25B 27/08*  (2006.01)

(52) U.S. Cl.
  CPC ........... *B25B 27/14* (2013.01); *B25B 27/08* (2013.01); *F16G 15/02* (2013.01)

(58) Field of Classification Search
  CPC ......... B25B 27/08; B25B 27/14; F16B 21/12; F16G 15/02; Y10T 29/53809
  USPC ...................................... 72/409.17; 411/364
  See application file for complete search history.

(56) References Cited

U.S. PATENT DOCUMENTS

| | | | | |
|---|---|---|---|---|
| 1,236,016 A * | 8/1917 | Stone | ...... | B25B 27/08 29/247 |
| 1,516,877 A * | 11/1924 | Anekee | ...... | B25B 27/08 72/403 |
| 2,330,013 A * | 9/1943 | Schultz | ...... | B25B 27/08 29/247 |
| 2,821,100 A * | 1/1958 | Decker | ...... | B25B 27/08 72/383 |
| 2,854,874 A * | 10/1958 | Decker | ...... | B25B 27/08 29/243.5 |
| 3,656,293 A * | 4/1972 | Lowery, Sr. | ...... | F16G 15/06 59/86 |
| 4,195,873 A * | 4/1980 | Johnston | ...... | B66C 1/14 294/106 |
| 5,152,652 A * | 10/1992 | Nadherny | ...... | F16B 21/12 411/364 |
| 9,724,809 B2 * | 8/2017 | Jones | ...... | F16B 21/12 |

FOREIGN PATENT DOCUMENTS

| | | | | |
|---|---|---|---|---|
| CN | 201115950 Y | * | 9/2008 | ............ B21D 28/02 |
| CN | 104384292 A | * | 3/2015 | ............ B21D 28/02 |

* cited by examiner

*Primary Examiner* — Joseph J Hail
*Assistant Examiner* — Arman Milanian
(74) *Attorney, Agent, or Firm* — Charles F. Reidelbach, Jr.

(57) ABSTRACT

A key press facilitates securing a shackle assembly used for connecting chains, buoys, and other devices used for watercraft applications. The shackle assembly includes a shackle, a bolt, and a split key. The shackle has two shackle legs with openings. The bolt includes a shaft with a distal end having a slot. The split key has two split key legs extending from an enlarged rounded end. The key press includes a receptacle and a wedge head having an apex. The shaft of the bolt is passed through the shackle leg openings and then the split key legs are passed through the slot. The distal end of the bolt is the placed into the receptacle. The wedge head is lowered until the apex is placed between the split key legs which are then bent away from each other so as to secure the shackle assembly.

15 Claims, 6 Drawing Sheets

US 10,183,387 B2

KEY PRESS FOR SECURING A SHACKLE ASSEMBLY

FIELD OF THE INVENTION

The present disclosure relates to a shackle assembly used to connect together chains, buoys, and devices used for watercraft applications. More particularly the present disclosure concerns an advantageous device for efficiently and effectively securing a marine shackle assembly for large water vessels.

BACKGROUND

Large marine shackle assemblies are used by military and commercial crew members for coupling chains, buoys, and other objects. An example of such a shackle assembly 2 is illustrated with respect to FIGS. 1A-C. A shackle assembly 2 includes a shackle 4, a bolt 6, and a split key 8.

In an exemplary embodiment shackle 4 is U-shaped with a closed curved end 10 from which two shackle legs 12 extend. The two legs have axially aligned cylindrical openings 14. The bolt 6 includes a head 16 and a shaft 18 extending from the head 16. Shaft 18 also has a rectangular vertical slot 20 formed therethrough and centered upon a diameter of shaft 18. The split key 8 has a enlarged rounded end 22 from which two split key legs 24 extend.

Comparing FIGS. 1A and 1B, the shaft 18 of the bolt 6 is received through the axially aligned cylindrical openings 14 in order to close shackle 4. The shaft 18 is secured in a position that closes shackle 4 by passing the split key legs 24 of split key 8 through vertical slot 20 of bolt 6 and then bending the legs away from one another as depicted in FIG. 1C.

In practice this procedure is difficult. For large marine applications the shaft 18 can be over two inches in diameter. A hammer is typically used or required to bend the split key into the configuration shown in FIG. 1C. It is challenging to hold the split key 8 in its proper position and then to obtain the proper angle between key legs 24. Each leg needs to be bent by an angle in the range of about 40-50 degrees in order for this procedure to be effective. If the angle is too small the split key 8 may fall out during use. If the angle is too large the split key 8 may fail due to excessive bending stress. Also, too large of an angle will make the later removal of split key 8 difficult. Finally, the process of bending split key 8 can be a time consuming and difficult process. There is a need to improve the speed and accuracy of installing split keys 8.

SUMMARY

Figure 1A:
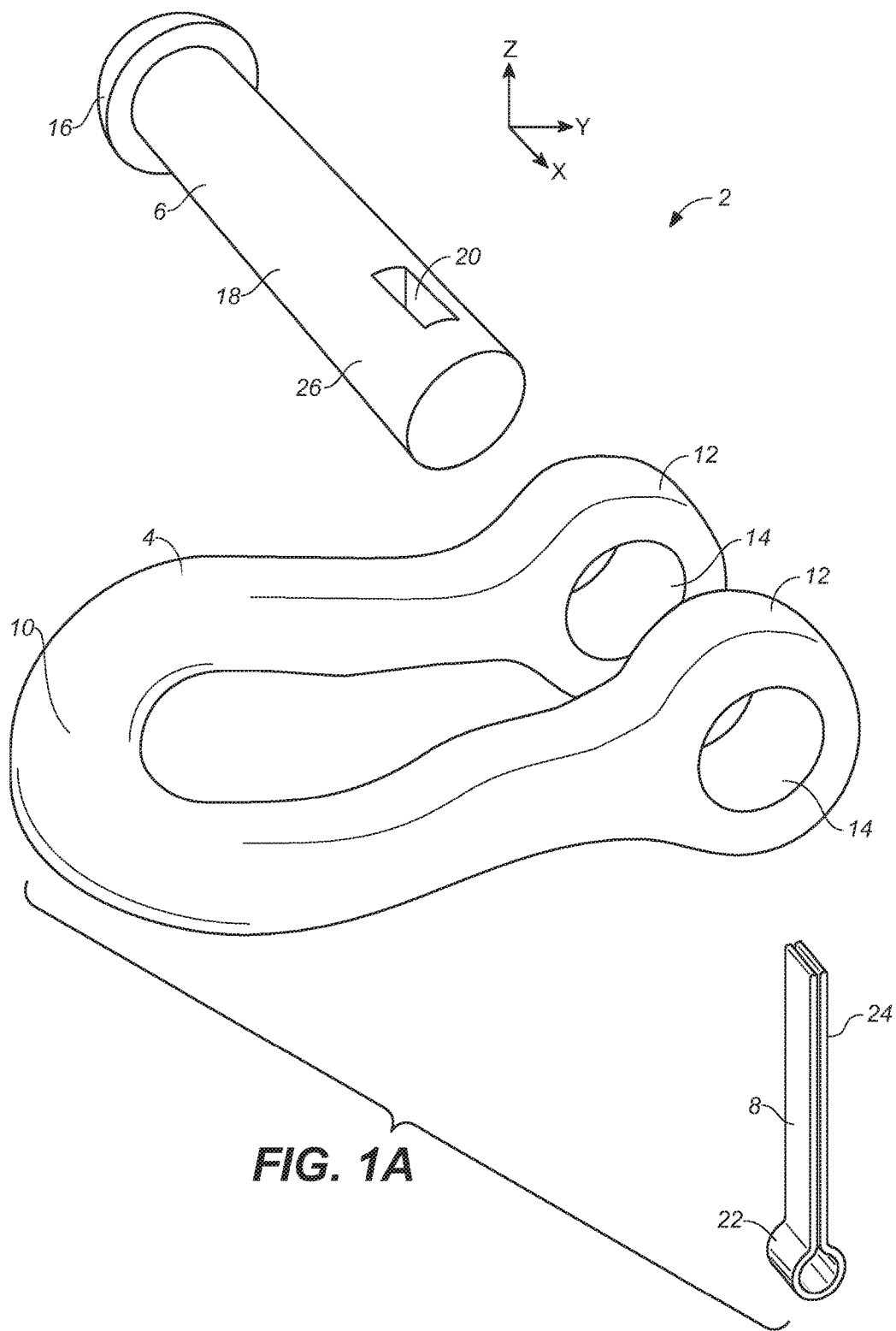
FIG. 1A is an isometric illustration of an exemplary shackle assembly parts in an unassembled state.

A key press is provided for securing a shackle assembly. The shackle assembly includes a shackle, a bolt, and a split key. The shackle includes a closed end from which two shackle legs extend. A cylindrical opening extends through each of the shackle legs. The bolt includes a head from which a shaft extends. The shaft extends through the two cylindrical openings. A distal end of the shaft extends beyond one of the cylindrical openings. A vertical slot is formed through the distal end of the shaft. The split key includes a pair of split key legs extending from an enlarged rounded end. The slit key legs extend upwardly through the slot. In the present disclosure the split key legs are illustrated as being equal in length. However, in some implementations the key legs can be unequal in length.

In a first aspect of the disclosure, the key press includes a receptacle, a wedge head, and a mechanism coupled to the receptacle and the wedge head. The receptacle is for receiving the bolt shaft with the split key inserted through the slot. The receptacle includes a receiving surface that aligns the slot by aligning the bolt along a splitting axis. The receptacle also engages the enlarged end of the split key to restrain vertical motion of the split key. The wedge head has an apex for separating the key legs along the splitting axis and two sloped surfaces for bending the split key legs along the spitting axis and the vertical axis at a controlled angle relative to the vertical axis. The mechanism aligns the wedge head to the receptacle whereby the apex is aligned to the vertical slot along the splitting axis.

In one implementation the receiving surface is substantially cylindrical. In one embodiment the cylindrical receiving surface has a diameter in a range of two to three inches.

In another implementation the receiving surface is divided by a recess that receives the enlarged rounded end of the split key. In one embodiment the slot and the recess each have a width along the splitting axis, the width of the recess is greater than the width of the slot as measured along the splitting axis. In another embodiment, the recess has a recess bottom that engages the enlarged end of the split key to restrain vertical motion of the split key.

In yet another implementation the wedge includes a beak that extends downwardly from the sloped surfaces. The beak forms the apex and defines an included angle. The sloped surfaces define an included angle which is larger than the included angle of the beak. The smaller included angle of the beak reduces a force required to initially separate the split key legs. In various embodiments the included angle of the beak is less than 80 degrees or less than 60 degrees or less than 50 degrees or in a range of 40 to 50 degrees or about 42 degrees.

In a further implementation, the sloped surfaces define an included angle with respect to each other that is in a range of 80 to 100 degrees or about 90 degrees. The included angle defines a bending geometry of split key legs along axes Y and Z.

In another aspect of the disclosure, a method for assembling and securing a shackle assembly includes (1) passing the shaft through the cylindrical openings in the shackle legs to close the shackle; (2) passing the split key legs upwardly through the slot; (3) placing the bolt shaft into the receptacle of a key press whereby a receiving surface of the receptacle aligns the slot along a splitting axis and the receptacle engages the enlarged end of the split key to restrain vertical motion of the split key; (4) engaging the split key legs with an apex of a wedge head of the key press to separate the key legs along the splitting axis, the key press constraining the alignment and motion of the wedge head relative to the receptacle; (5) pressing the key legs with two sloped surfaces of the wedge head until the key legs are bent along the vertical axis and the splitting axis with a controlled angle with respect to the vertical axis.

In one implementation the receiving surface is cylindrical. In an exemplary embodiment the cylindrical receiving surface has a diameter in a range of one to two inches.

In one implementation, placing the bolt shaft into the receptacle of the key press causes the enlarged end of the split key to pass into a recess that centrally divides the receiving surface. In one embodiment a bottom surface of the recess provides the vertical restraint of the split key.

In one implementation, the apex is defined by a beak that extends between the apex and the sloped surfaces, the apex is defined by two beak surfaces that have a smaller included angle than the sloped surfaces.

DETAILED DESCRIPTION OF THE
PREFERRED EMBODIMENTS

For purposes of accurate disclosure, certain axes, directions, and dimensions are now defined. Referring to FIG. 1A, mutually perpendicular axes X, Y, and Z are defined. Axes X and Y are referred to as "lateral axes" or lateral directions" and axis Z is referred to as a "vertical axis" or "vertical direction." Direction +X is the "closure" direction and −X is the "opening" direction. Axis Y is the "splitting" axis. Direction −Z is the "downward" direction and direction +Z is the "upward" direction. The "lower end" of an object or motion is its farthest extent in the −Z direction. The "upper end" of an object or motion is its farthest extent in the +Z direction.

The axes are also defined relative to the shackle assembly 2 and its placement with respect to a key press 30 for facilitating the bending of split key 8 as will be described with respect to FIGS. 2A-B, 3A-C, and 4. Moreover these axes are all defined relative to the positioning of all components when shackle assembly 2 is assembled or shackle 4 is closed according to the present disclosure.

Axis X can be referred to as "closure axis X" along which shackle 4 is closed by the shaft 18 of bolt 6. Axis X coincides with the axes of cylindrical openings 14 and the central axis of bolt 6. The shaft 18 of bolt 6 extends along closure axis X. In closing shackle 4, the shaft 18 is displaced in the +X direction and passed through cylindrical openings 14 until a distal end 26 of shaft 18 extends beyond an cylindrical opening 14 of shackle 4. The bolt 6 is restrained from further displacement in X by head 16 which engages a shackle leg 12 around one of the openings 14.

Slot 20 is defined in the distal end 26 of shaft 18. Slot 20 is a vertical slot having a rectangular cross section along lateral axes X and Y. The lateral rectangle defined by slot 20 has a long axis along X and a short axis along Y. Slot 20 extends vertically along vertical axis Z.

Split key 8 has a long axis that extends along vertical axis Z. Enlarged rounded end 22 is positioned at the lower end of split key 8. The split key legs 24 extend in an upward +Z direction from rounded end 22. When split key 8 is assembled to distal end 26 of shaft 18, the key legs 24 are passed through slot 20 in an upward +Z direction. The enlarged rounded end 22 of split key 8 limits the upward insertion of key legs 24 through the interference of enlarged rounded end 22 with the edge of slot 20.

The key legs 24 are to be separated laterally along the splitting axis Y. After being bent, each key leg 24 will then extend along the splitting axis Y and the vertical axis Z. The shackle 4 extends along lateral axes X and Y. A gap between shackle legs 12 extends along X. The shackle legs 12 each extend along Y from closed curved end 10.

Figure 2A:
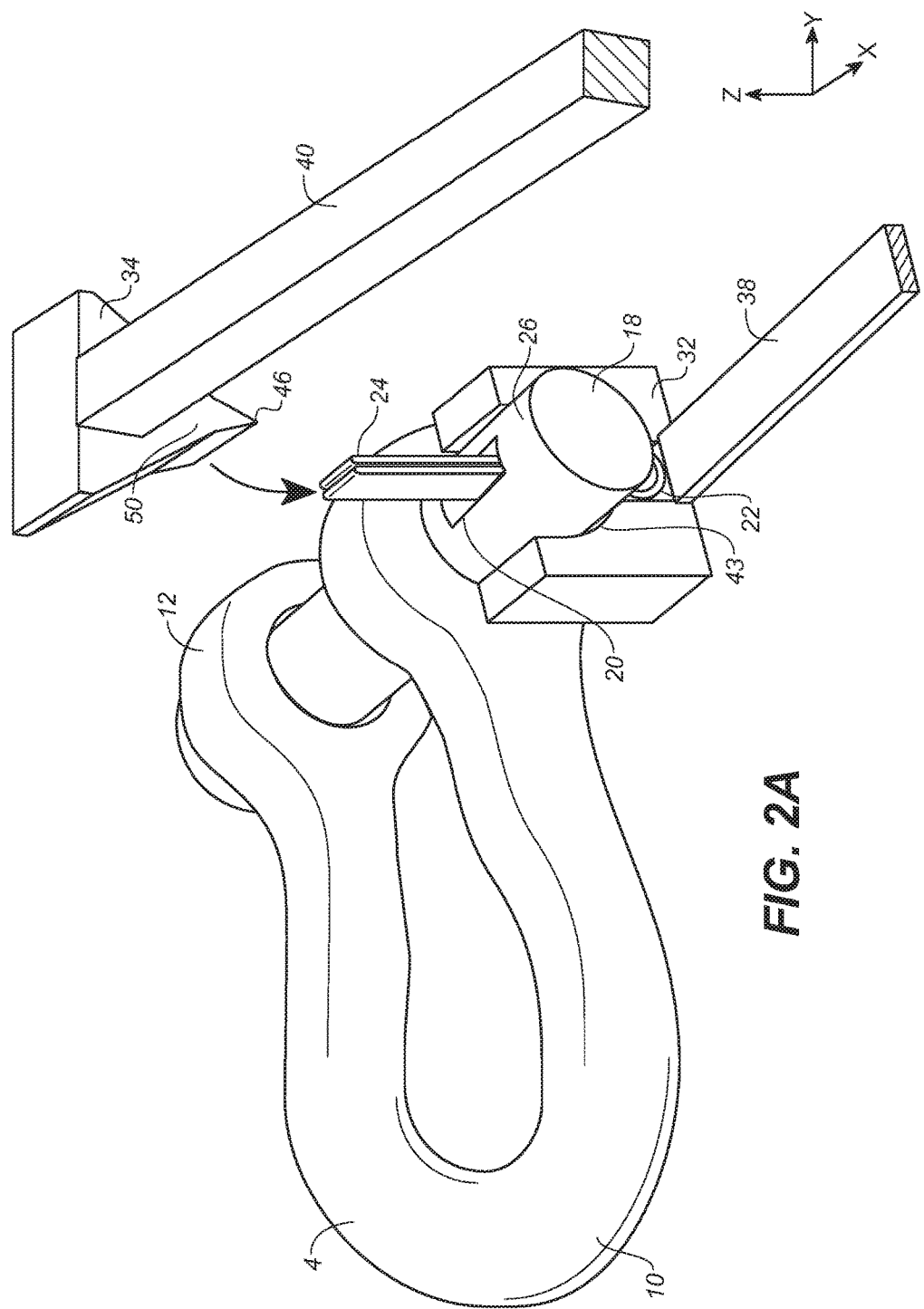
FIG. 2A is an isometric illustration of an exemplary shackle assembly positioned in a key press and positioned to bend a split key.
Figure 2B:
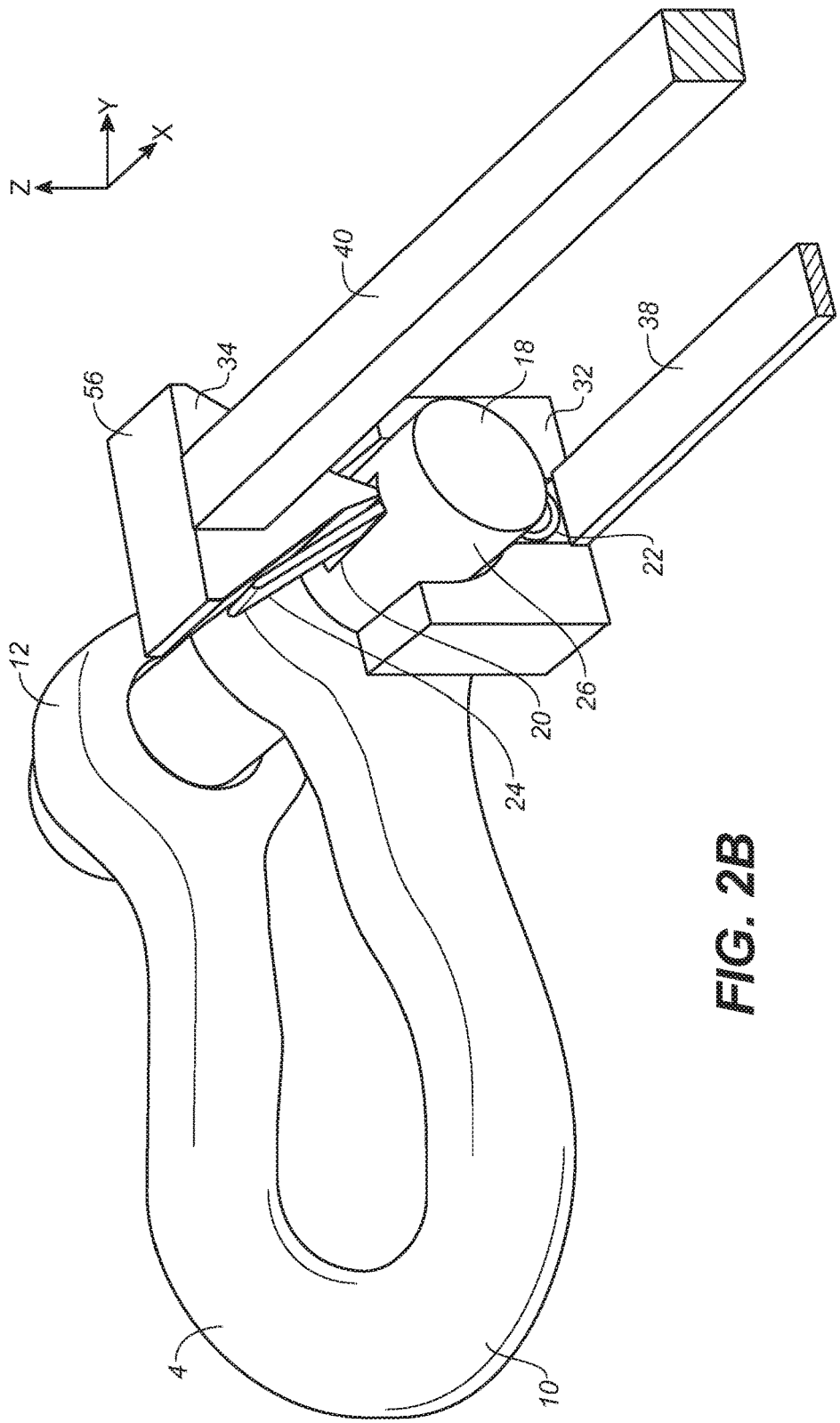
FIG. 2B is an isometric illustration of an exemplary shackle assembly positioned in a key press that is bending a split key.
Figure 3C:
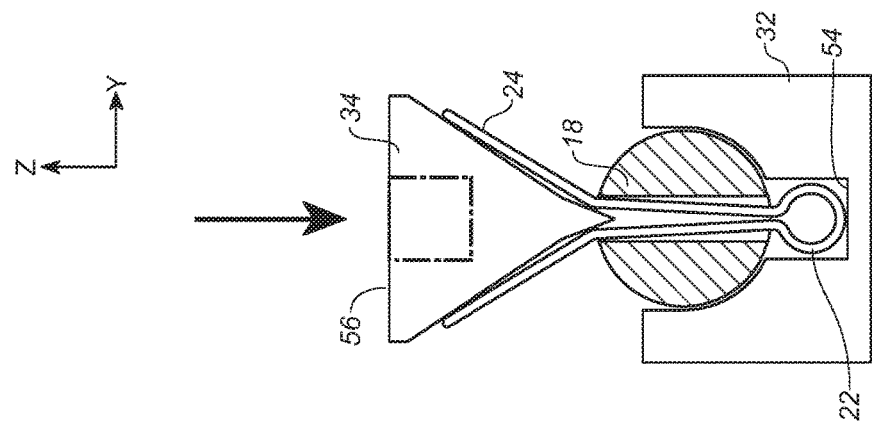
FIG. 3C is an end view illustration of an exemplary shackle assembly positioned in a key press that is bending a split key.
Figure 3B:
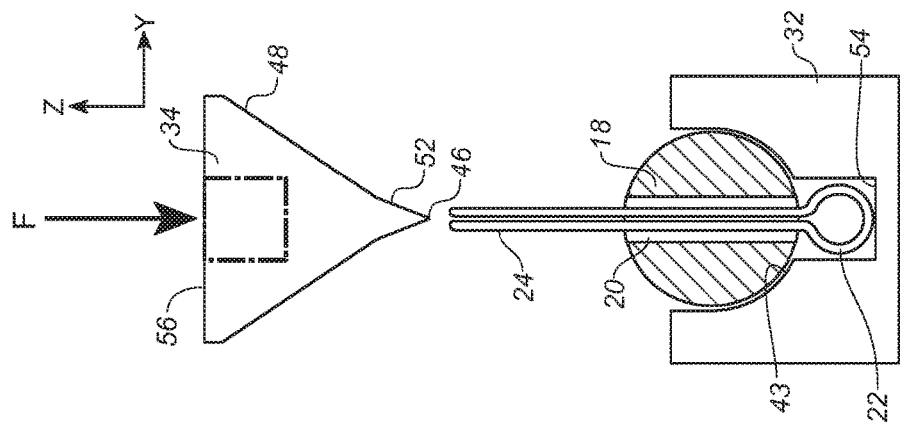
FIG. 3B is an end view illustration of an exemplary shackle assembly positioned in a key press and positioned to bend a split key.
Figure 3A:
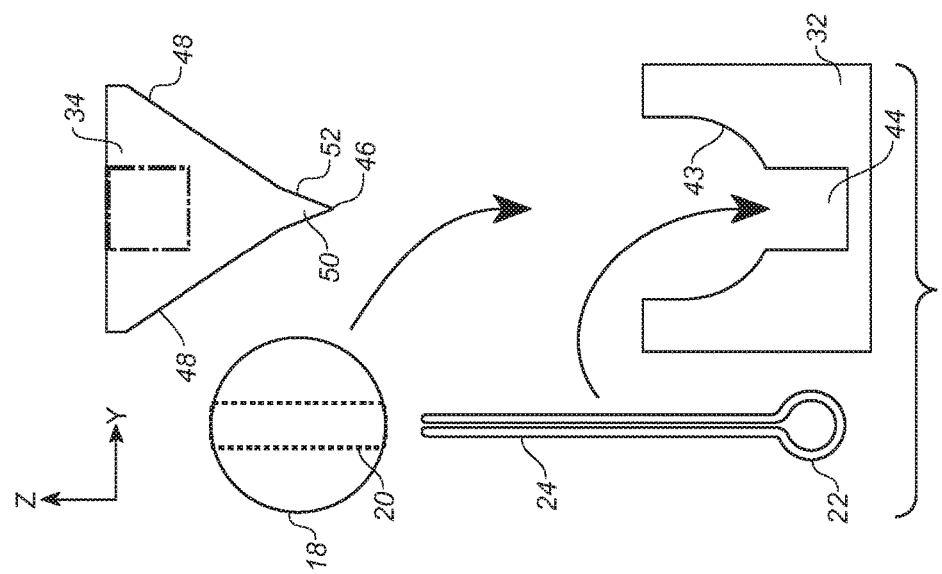
FIG. 3A is an end view illustration of portions of an unassembled shackle assembly and portions of a key press.
Figure 4:
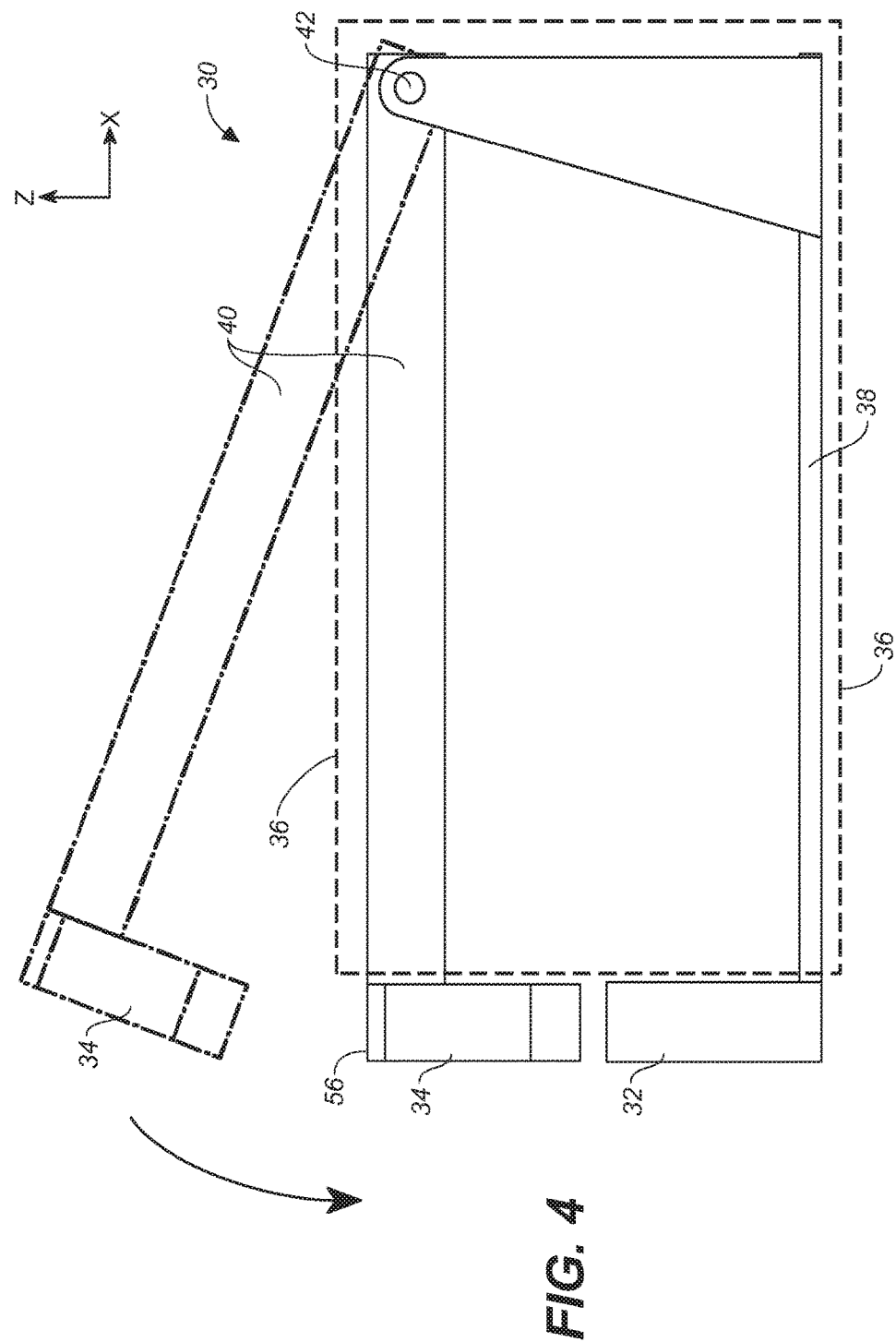
FIG. 4 is a side view illustration of an exemplary key press and its mechanical operation.

FIGS. 2A, 2B, 3A-C, and 4 depict an exemplary key press 30 for securing an assembled shackle assembly 2. Referring to FIG. 4, key press 30 includes receptacle 32 and wedge head 34 that are mechanically coupled to mechanism 36. Mechanism 36 is configured to hold or maintain receptacle 32 and 34 in relative alignment in all three axes X, Y, and Z as well as to control motion of wedge head 34 with respect to receptacle 32.

In the illustrative embodiment, mechanism 36 includes a base 38 extending along axes X and Z. Mechanism 36 also includes rotating arm 40 that is pivotally attached to base 38 at hinge 42. Hinge 42 constrains rotating arm to rotate between an upper angled position (dashed lines) to a lower working position (solid lines). In the working position, the rotating arm 40 constrains the wedge head 34 to move almost entirely along vertical axis Z with a slight component along X.

FIG. 3A depicts an end view of receptacle 32 and wedge head 34 as viewed along the +X direction. Receptacle 32 includes a cylindrical or tapering receiving surface 43 that is divided along the Y direction by a recess 44. In the illustrated embodiment, receiving surface 43 is a circular cylindrical surface 43 having an axis X that coincides with the axis X of the shaft 18. In the illustrated embodiment, recess 44 is a rectangular recess 44. Recess 44 has a width along Y that is larger than the width of vertical slot 20 along Y. This allows for the accommodation of an enlarged rounded end 22 having sufficient width along Y so as to restrain upward +Z motion of spit key 8.

Wedge head 34 tapers in a downward direction −Z toward apex 46. Wedge head 34 includes two sloped surfaces 48 that generally converge in the downward direction −Z. In an exemplary embodiment, each sloped surface 48 defines an angle with respect to vertical axis Z in a range of 40 to 50 degrees or about 45 degrees. An included angle of the two sloped surfaces 48 with respect to each other can have a range of 80 to 100 degrees or about 90 degrees. This defines the geometry of bending key legs 24 along axes Y and Z.

In the illustrated embodiment, wedge head 34 also includes a beak 50 that is defined by two beak surfaces 52 that define apex 46. Each beak surface 52 intersects with a sloped surface 48 and apex 46. Each beak surface defines an angle with respect to Z that is less than 40 degrees or less than 30 degrees or in a range of 20 to 25 degrees or about 21 degrees. The beak surfaces define an included angle with respect to each other that is less than 80 degrees or less than 60 degrees or in a range of 40 to 50 degrees or about 42 degrees. Beak 50 provides the benefit of reducing a force required to initially separate the key legs 24 along axis Y.

The alignment along the Y axis between features of receptacle 32 and wedge head 34 is maintained by the mechanism 36. In the illustrated embodiment, the apex 46 is aligned to axis X which is the axis of cylindrical surface 43. Apex 46 is also aligned to the center of recess 44 along Y as viewed along axis X.

Figure 1B:
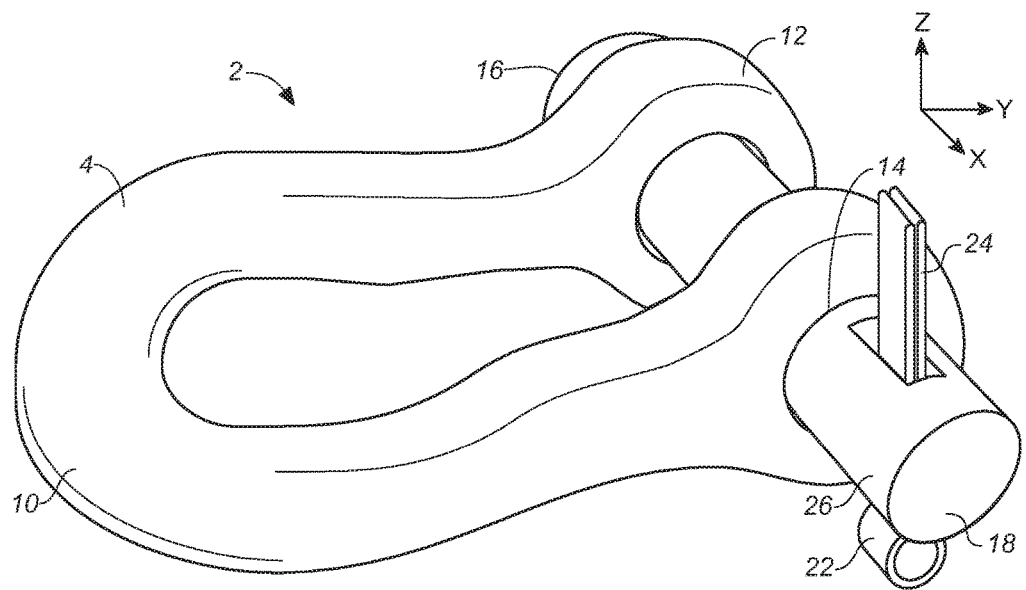
FIG. 1B is an isometric illustration of an exemplary shackle assembly in an assembled but as yet unsecured state.

The use of key press 30 is now described with respect to FIGS. 1A, 1B, 2A, 2B, 3B, and 3C. Referring to FIGS. 1A and 1B, the shackle mechanism is initially assembled by passing shaft 18 through cylindrical openings 14 along the closure direction +X until head 16 is stopped by a shackle leg 12 and distal end 26 of shaft 18 extends out of opening 14 of one leg 12 of shackle 4. Next the closed key legs 24 are passed upwardly +Z through slot 20 until upward motion is halted by interference between enlarged end 22 of split key 8 and the edges of slot 20. This results in the assembled configuration of shackle assembly 2 as depicted in FIG. 1B.

Once the shackle assembly 2 is assembled, the distal end 26 of shaft 18 is placed into the receptacle 32 as illustrated in FIGS. 2A and 3B. The tapered or cylindrical surface 43 then engages shaft 18 to align the slot 20 to the apex 46 of wedge head 34 along the axis Y. In one embodiment the surface 43 is a cylindrical surface 43 to accommodate the largest diameter of shaft 18 that is to be used with key press 30. In exemplary embodiments cylindrical surface has a diameter between two and three inches or about two and three sixteenth inches or about 2.1875 inches.

When distal end 26 of shaft 18 placed in receptacle 32, the enlarged end 22 of split key 8 is received into recess 44. Enlarged end 22 engages the bottom 54 of recess 44. The vertical location of recess bottom surface 54 relative to axis X properly maintains the vertical position of split key 8 relative to shaft 18 and to slot 20.

With the distal end 26 of shaft 18 properly positioned in receptacle 32, the wedge head 32 is lowered into position in a downward −Z direction until the apex 46 of wedge head is placed on top of or between key legs 24. In one embodiment, a user manually guides the apex 46 of beak 50 into a suitable position on top of or between key legs 24. A downward force F is exerted on wedge head 32 which causes beak 50 to separate split key legs 24 along the splitting axis Y. In one embodiment, a force F is exerted by the use of a hammer against an upper surface 56 of wedge head 34 after beak 50 is properly positioned on top of or between key legs 24.

After beak 50 has provided an initial separation along Y, the split key legs 24 are bent into a secure configuration as further illustrated in FIGS. 2B and 3C. The force downward force F is further applied as the two sloped surfaces 48 engage the split key legs 24 to bend them into their secure configuration. As illustrated in FIG. 3C, each split key leg 24 extends along axes Y and Z to define an angle with vertical axis Z in a range of 40 to 50 degrees. In an exemplary embodiment each split key leg 24 defines an angle with axis Z of about 45 degrees. In exemplary embodiments the total included angle between the split key legs 24 is in a range of 80 to 100 degrees or about 90 degrees.

Figure 1C:
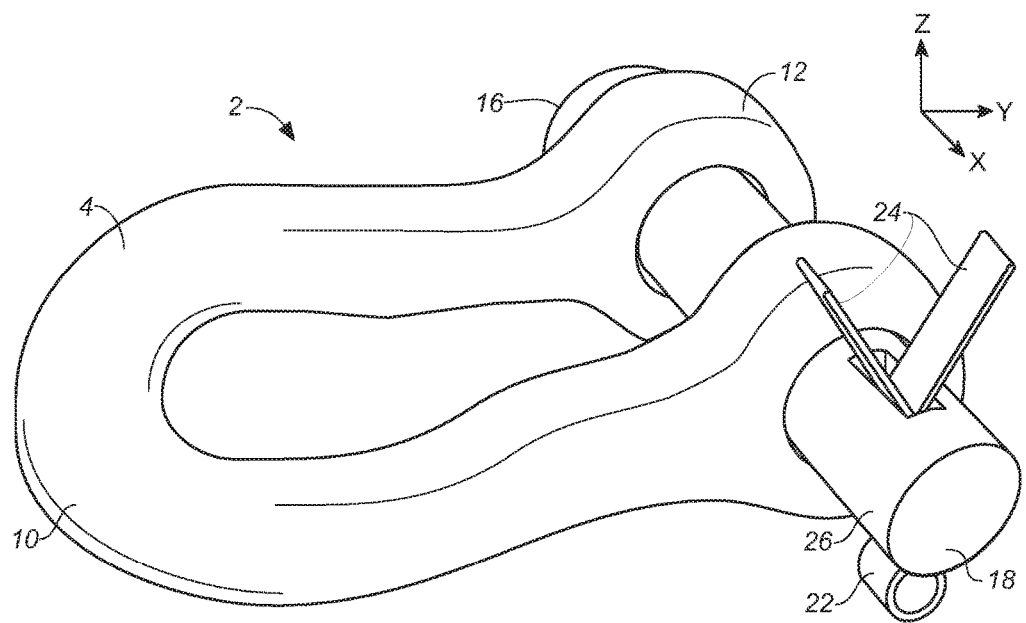
FIG. 1C is an isometric illustration of an exemplary shackle assembly in an assembled and secured state.

After spit key 8 is bent as illustrated in FIGS. 2B and 3C, the key press 30 can be removed from shackle assembly 2. Shackle assembly 2 is then in an assembled and secure configuration as illustrated with respect to FIG. 1C.

The key press 30 can also be used to remove the split key 8 from the shackle assembly 2 after it has been assembled in a secure configuration. To remove the split key 8, the distal end 26 of shaft 18 is properly positioned in receptacle 32 as described above, and a hammer is used to force the bent key legs 24 to their original or unbent configuration for easy removal of the split key 8 from slot 20.

Alternatives may be possible. For example, the force F may be exerted by other mechanical means besides a hammer. For example, the force F might be exerted by a force exerting mechanism that may be operated by a lever and cam, a motorized lead screw, a motorized cam, or a solenoid valve, to name a few examples. Other angles or dimensions may be optimal for other types of shackles. The specific embodiments and applications thereof described above are for illustrative purposes only and do not preclude modifications and variations encompassed by the scope of the following claims.

What we claim is:

1. A key press for securing a shackle assembly, the shackle assembly including a shackle having two shackle legs with openings for receiving a bolt shaft, the bolt shaft having a slot for receiving the legs of a split key, the split key having an enlarged end from which the split key legs extend, the key press comprising:

a receptacle for receiving the bolt shaft with the split key inserted through the slot, the receptacle having a cylindrical receiving surface that receives and engages a cylindrical surface of the bolt shaft to align aligns the bolt shaft along a splitting axis, the cylindrical receiving surface is divided by a rectangular recess that extends downwardly from a lower portion of the cylindrical receiving surface and has a width that is less than the diameter of the cylindrical receiving surface and receives the enlarged end of the split key;

a wedge head having an apex for separating the key legs along the splitting axis and two sloped surfaces for bending the legs along the splitting axis and a vertical axis at a controlled angle relative to the vertical axis; and a mechanism coupled to the receptacle and to the wedge head, the mechanism aligning the wedge head to the receptacle whereby the apex is substantially aligned with the slot along the splitting axis.

2. The key press of claim 1 wherein the cylindrical receiving surface has a diameter in a range of two to three inches.

3. The key press of claim 1 wherein the slot and the recess each have a width defined along the splitting axis and wherein the recess width is greater than the slot width.

4. The key press of claim 1 wherein the wedge head has a beak that extends downwardly from the two sloped surfaces and defines the apex, the beak defining an included angle that is less than an included angle defined by the two sloped surfaces.

5. The key press of claim 1 wherein the two sloped surfaces define an included angle with respect to each other in a range of 80 to 100 degrees.

6. The key press of claim 1 wherein engaging the wedge head with the key legs bends the key legs along the splitting axis and a vertical axis whereby the key legs define an included angle in a range of 80 to 100 degrees.

7. The key press of claim 1 wherein the receptacle has a recess bottom that engages the enlarged end of the split key to restrain vertical motion of the split key while the key legs are being bent.

8. A method for closing and securing a shackle assembly, the shackle assembly including a shackle having two shackle legs with openings for receiving a bolt shaft, the bolt shaft having a slot for receiving the legs of a split key, the split key having an enlarged end from which the split key legs extend, the method comprising:

passing the bolt shaft through the openings in the shackle legs to close the shackle;

passing the split key legs upwardly through the slot;

placing the bolt shaft generally downwardly into a receptacle of a key press whereby a cylindrical receiving surface of the receptacle receives and engages a cylindrical surface of the bolt shaft to align the slot along a splitting axis and a narrowed rectangular recess extending downwardly from the cylindrical receiving surface and having a width that is less than the diameter of the cylindrical receiving surface of the receptacle engages the enlarged end of the split key to restrain vertical motion of the split key;

engaging the split key legs with an apex of a wedge head of the key press to separate the key legs long the splitting axis, the key press constraining the alignment and motion of the wedge head relative to the receptacle; and pressing the key legs with two sloped surfaces of the wedge head until the key legs are bent along the vertical axis and the splitting axis with a controlled angle with respect to the vertical axis.

9. The method of claim 8 wherein placing the bolt shaft into the receptacle of the key press causes the enlarged end of the split key to pass into a recess that centrally divides the receiving surface.

10. The method of claim 9 wherein a bottom surface of the recess engages the enlarged end of the split key to provide the vertical restraint of the split key.

11. The method of claim 8 wherein the apex is defined by a beak having two beak surfaces that defined a combined beak angle, the sloped surfaces define a combined bending angle which is greater than the combined beak angle whereby a force to initially separate the key legs is reduced.

12. The method of claim 8 wherein the angle between the key legs after bending is in a range of 80 to 100 degrees.

13. A key press for securing a shackle assembly, the shackle assembly including a shackle having two legs with openings for receiving a bolt shaft, the bolt shaft having a vertical slot extending along a vertical axis for receiving the legs of a split key, the split key having an enlarged end from which the split key legs extend, the key press comprising:

a receptacle for receiving the bolt shaft with the split key inserted through the slot, the receptacle having a tapering receiving surface that receives and engages a cylindrical surface of the bolt shaft to align the bolt shaft along a splitting axis and a rectangular recess having a surface for engaging the enlarged end of the split key to restrain motion of the split key along the vertical axis the recess extending from a lower end of the tapering receiving surface and having a narrower width along the splitting axis than a diameter of a bolt shaft that can be accommodated by the tapering receiving surface;

a wedge head having an apex for separating the key legs along the splitting axis and two sloped surfaces for bending the legs along the splitting axis and the vertical axis at a controlled angle relative to the vertical axis; and a mechanism coupled to the receptacle and to the wedge head, the mechanism aligning the wedge head to the receptacle whereby the apex is substantially aligned with the vertical slot along the splitting axis.

14. The key press of claim 13 wherein the two sloped surfaces define an overall angle with respect to each other in a range of 80 to 100 degrees.

15. The key press of claim 13 wherein engaging the wedge head with the key legs bends the key legs along the splitting axis and a vertical axis whereby the key legs define a total angle with respect to each other in a range of 80 to 100 degrees.

* * * * *